(12) United States Patent
El Bernoussi et al.

(10) Patent No.: US 10,214,369 B2
(45) Date of Patent: Feb. 26, 2019

(54) UNSTACKER DEVICE WITH A VISION SYSTEM

(71) Applicant: Solystic, Bagneux (FR)

(72) Inventors: Hicham El Bernoussi, Paris (FR); Jean-Marc Teluob, Cornas (FR); Stèphane Ambroise, Serves sur Rhône (FR)

(73) Assignee: SOLYSTIC, Bagneux (FR)

( * ) Notice: Subject to any disclaimer, the term of this patent is extended or adjusted under 35 U.S.C. 154(b) by 0 days.

(21) Appl. No.: 15/300,573

(22) PCT Filed: Jun. 3, 2016

(86) PCT No.: PCT/FR2016/051338
§ 371 (c)(1),
(2) Date: Feb. 14, 2018

(87) PCT Pub. No.: WO2016/198769
PCT Pub. Date: Dec. 15, 2016

(65) Prior Publication Data
US 2018/0148281 A1    May 31, 2018

(30) Foreign Application Priority Data
Jun. 11, 2015 (FR) ...................... 15 55315

(51) Int. Cl.
*B65H 1/02* (2006.01)
*B65H 7/14* (2006.01)

(52) U.S. Cl.
CPC ............... *B65H 1/025* (2013.01); *B65H 7/14* (2013.01); *B65H 2511/214* (2013.01);
(Continued)

(58) Field of Classification Search
CPC ......................... B65H 1/025; B65H 2553/42
See application file for complete search history.

(56) References Cited

U.S. PATENT DOCUMENTS 6,182,962 B1 * 2/2001 Leuthold .................. B65H 1/24
271/126
7,467,792 B2 * 12/2008 Bittenbender ......... B65H 1/025
271/105
(Continued)

FOREIGN PATENT DOCUMENTS

EP    1902989 A1    3/2008
EP    2292539 A2    3/2011
(Continued)

OTHER PUBLICATIONS

International Search Report and Written Opinion dated Sep. 8, 2016 for Application No. PCT/FR2015/051338.
(Continued)

*Primary Examiner* — Luis A Gonzalez
(74) *Attorney, Agent, or Firm* — Patterson + Sheridan, LLP

(57) ABSTRACT

An unstacker device comprises a floor and a retaining paddle that are designed to move a stack of mailpieces from a feed magazine towards an unstacker head under the action of a monitoring and control unit as the mailpieces are being unstacked from the front of the stack. The device further comprises a vision system suitable for forming a profile digital image of said stack of mailpieces in the magazine, and said unit is arranged to evaluate a certain inclination of the mailpieces in the stack on the basis of said profile image and to cause the floor and the paddle to move so as to present the mailpiece at the front of the stack in a satisfactory position on edge so that it can be unstacked by the unstacker head.

4 Claims, 2 Drawing Sheets

(52) U.S. Cl.
CPC .... *B65H 2511/413* (2013.01); *B65H 2513/10* (2013.01); *B65H 2513/40* (2013.01); *B65H 2553/42* (2013.01); *B65H 2701/1916* (2013.01)

(56) References Cited

U.S. PATENT DOCUMENTS

| | | | | |
|---|---|---|---|---|
| 7,712,735 | B2* | 5/2010 | Chorier-Pichon | B65H 3/124 |
| | | | | 271/149 |
| 8,235,377 | B2* | 8/2012 | Ambroise | B07C 1/02 |
| | | | | 271/10.01 |
| 9,216,869 | B2* | 12/2015 | Hildebrandt | B65H 1/04 |
| 2007/0071284 | A1* | 3/2007 | Philippe | B65H 7/125 |
| | | | | 382/101 |
| 2011/0051997 | A1* | 3/2011 | Nakano | B65H 1/025 |
| | | | | 382/100 |
| 2014/0271087 | A1 | 9/2014 | Brown et al. | |

FOREIGN PATENT DOCUMENTS

| | | | | | |
|---|---|---|---|---|---|
| JP | 2001253577 | A | * | 9/2001 | |
| JP | 2001335165 | A | * | 12/2001 | ............. B65H 3/124 |
| WO | 0026861 | A1 | | 5/2000 | |

OTHER PUBLICATIONS

French Search Report dated Apr. 26, 2016, for Application No. 1555315.

* cited by examiner

UNSTACKER DEVICE WITH A VISION SYSTEM

TECHNICAL FIELD

The invention relates generally to unstacking flat articles so as to put them into series on a conveyor or the like, and it relates more particularly to unstacking mailpieces at feed inlets of postal sorting machines.

The invention relates more particularly to an unstacker device comprising a feed magazine suitable for storing mailpieces in a stack and on edge, and an unstacker head suitable for unstacking the mailpieces one-by-one from the front of the stack in the magazine, the magazine having a floor on which the mailpieces stand on edge and a retaining paddle that retains the back of the stack, the floor and the paddle being designed to move the stack towards the unstacker head under the action of a monitoring and control unit as the mailpieces are being unstacked from the front of the stack.

PRIOR ART

Current postal sorting machines are designed to handle a broad spectrum of mailpieces such as, for example, letters, postcards, open magazines, and mailpieces that are thin, flexible, thick, non-wrapped or wrapped in paper envelopes or in sheets of plastic material.

All such mailpieces are generally stacked on edge in a feed magazine of an unstacker having an unstacker head of the type comprising a suction nozzle and a perforated belt.

In certain situations, the mailpieces can tend to slip down or slump if the stack does not remain compact enough as the unstacking takes place.

In certain configurations, if the inclination of the mailpieces is not uniform over the magazine, straightening up the mailpieces present facing the unstacker head causes the remainder of the stack to tip forward, which can then cause a jam in the unstacker.

The mailpieces at the front of the stack can also tend to slip at their bottoms towards the front or the back of the stack, resulting in them not being correctly pressed against the unstacker head, thereby preventing them from being unstacked and sometimes leading to a jam in the unstacker.

Thus, the presence of an operator can be necessary to oversee unstacking of the mailpieces and to intervene, in particular, in the event that some mailpieces in the stack tip forwards or backwards.

Unfortunately such interventions slow down the unstacking rate and increase the cost of operating a postal sorting machine.

As disclosed in Documents EP 2 292 539 and US 2014/271087, devices also exist that are suitable for detecting slipping-down or slumping of mailpieces in a stack and for straightening up such mailpieces.

SUMMARY OF THE INVENTION

An object of the invention is thus to remedy those drawbacks by proposing an improved unstacker device.

The basic idea of the invention is to use a vision system for observing the stack of mailpieces in profile in the magazine of the unstacker, and, by means of this observation, to anticipate action for straightening up the mailpieces in the stack so as to avoid situations in which mailpieces are completely slumped or completely tipped over forwards or backwards.

To this end, the invention provides an unstacker device comprising a feed magazine suitable for storing mailpieces in a stack and on edge, the mailpieces bearing laterally against a jogging edge that extends on one side of the magazine, and an unstacker head suitable for unstacking the mailpieces one-by-one from the front of the stack in the magazine, the magazine having a floor on which the mailpieces stand on edge and a retaining paddle that retains the back of the stack, the floor and the paddle being designed to move the stack towards the unstacker head under the action of a monitoring and control unit as the mailpieces are being unstacked from the front of the stack, said unstacker device further comprising a vision system suitable for detecting tipping of the stack forwards or backwards, and, for responding to such detection by causing the floor and the paddle to move in such a manner as to straighten up the stack in the magazine so as to place said mailpiece at the head of the stack in a satisfactory position of angular inclination so that it can be unstacked by the unstacker head, said unstacker head being characterized in that said system is a camera disposed on the side of the magazine that is opposite from the side on which the jogging edge is situated in order to form digital images of the mailpieces as seen in profile, and in that said monitoring and control unit is arranged to act on the basis of the profile images of the stack to detect at least one scenario corresponding to a situation in which the mailpieces are tipping forwards or backwards, or indeed a situation in which the mailpieces are slumping, and, as a function of the detected situation, to cause the floor and/or the paddle selectively or simultaneously to move forwards or backwards relative to the unstacker head so as to straighten up the stack in the magazine.

Thus, it can be understood that the monitoring and control unit can act on the movement of the paddle and of the floor so as to correct the inclination of the mailpieces in the stack even before the mailpieces reach the unstacker head.

In accordance with the invention, instead of straightening up only the current mailpiece that is contact with the unstacker head, action is taken in anticipation on the entire stack of mailpieces so as to reduce the risk of tipping of the mailpiece at the front of the stack.

The device of the invention may advantageously have the following features:
- the paddle has a certain angular inclination, and the monitoring and control unit causes the floor and the paddle to move so as to place the mailpiece at the head of the stack in a position of angular inclination that is substantially identical to the position of angular inclination of the paddle;
- the floor is provided with a setback or "drop" just before the unstacker head;
- the monitoring and control unit is suitable for applying appropriate control to the paddle and to the floor so as to correct a critical position of the stack that corresponds to a significant configuration from scene images acquired under real operating conditions with a learning algorithm.

BRIEF DESCRIPTION OF THE DRAWINGS

The present invention can be better understood and other advantages appear on reading the following detailed description of an embodiment given by way of non-limiting example and with reference to the accompanying drawings, in which.

DESCRIPTION OF EMBODIMENTS

Figure 1:
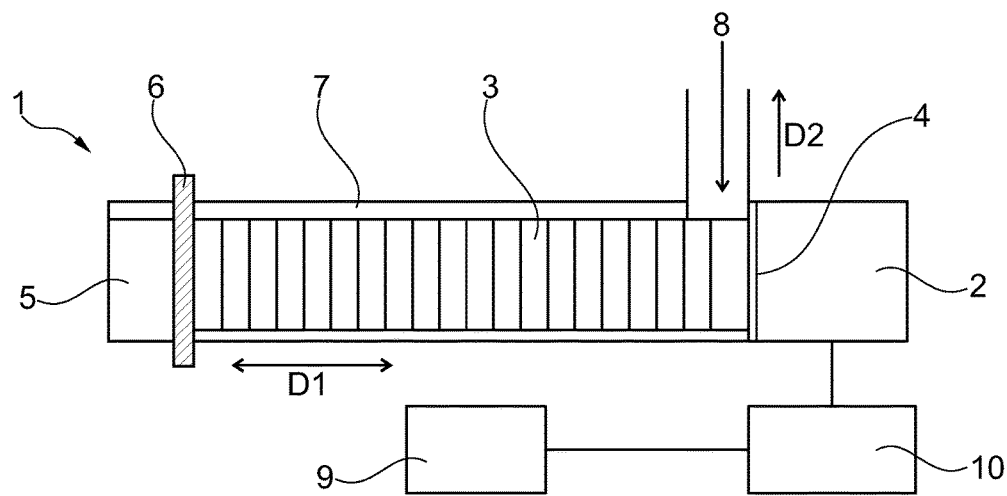
FIG. 1 is a diagrammatic view from above of the unstacker device of the invention for unstacking mailpieces.

With reference to FIG. 1, the unstacker device 1 of the invention includes an unstacker or unstacker head 2 designed to unstack mailpieces 3 so as to put them into series.

The unstacker 2 has a stationary unstacking plate 4 against which the mailpiece 3 at the head of the stack rests, face-against-face, ready for unstacking.

The mailpieces 3 are unstacked one-by-one in a manner known by the person skilled in the art.

The unstacker device 1 also includes a feed magazine in which a stack of mailpieces is stored.

This feed magazine has moving means suitable for moving the stack towards the unstacker head.

These means comprise, in particular, a conveyor 5 forming a floor, e.g. a conveyor belt, on which the mailpieces 3 rest on edge, and also a retaining paddle 6 against which the back of the stack bears.

In this example, the conveyor 5 is mounted to move in translation as indicated by arrow D1, relative to the inlet of the unstacker so as to present the mailpieces one-by-one facing the stationary plate of the unstacker.

The paddle is also mounted to move in translation as indicated by arrow D1.

As indicated by arrow D1, the floor 5 and the paddle 6 may be caused to move towards or away from the unstacker head 2.

A stationary jogging edge 7 extending along the conveyor 5 may be provided to form a lateral abutment against which the mailpieces 3 of the stack bear.

As can be seen in FIG. 1, each mailpiece at the front of the stack is separated from the remainder of the stack by shearing in a direction D2 perpendicular to D1.

FIG. 1 shows an extraction slot 8 that extends in said direction D2 between the jogging edge 7 and the unstacking plate 4, and via which the mailpiece that is unstacked is ejected.

Figure 2:
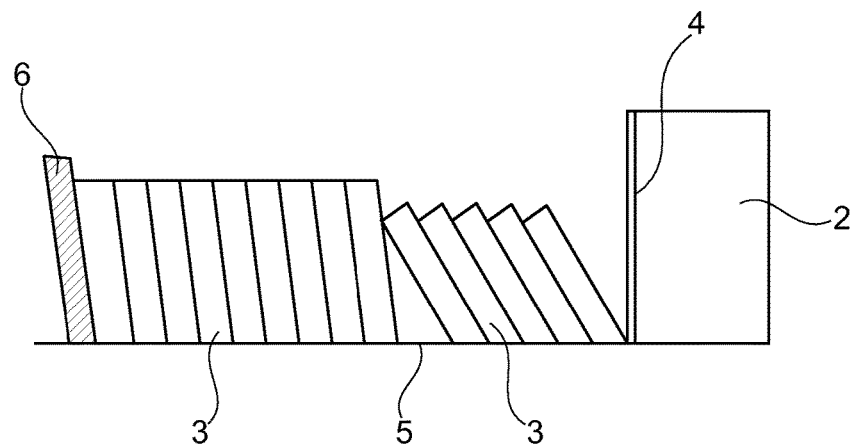
FIG. 2 is a diagrammatic view in profile of the unstacker device in a first mailpiece-tipping scenario of the invention.

As can be seen in FIG. 2, the paddle 6 is leaning relative to the vertical (backwards relative to the direction of movement towards the unstacker head). The angle of inclination may be about 10° relative to the vertical.

In accordance with the invention, the unstacker device 2 includes a vision system or camera 9 placed on one side of the magazine in a manner such as to form a profile digital image of the mailpieces.

In the example, the camera 9 is placed on the side of the magazine that is opposite from the side on which the jogging edge 7 is situated.

The camera 9 is connected to the monitoring and control unit 10 that is arranged to evaluate a certain inclination of the mailpieces in the stack on the basis of said profile image of the stack, and, on the basis of said evaluation, to cause the floor 5 and the paddle 6 to move so as to present the mailpiece at the front of the stack in a satisfactory position on edge so that it can be unstacked by the unstacker head 2, and more particularly in the same angular position as the paddle.

It should be understood that every time a mailpiece at the front of the stack is unstacked, the camera 9 forms a new profile image of the stack, and the unit 10 evaluates again the inclination of the mailpieces in the stack so that, in real time, it cause the floor and the paddle to move in such a manner as to anticipate situations in which mailpieces, in particular the mailpiece at the front of the stack, are completely slumped or completely tipped over forwards or backwards.

The evaluation of the inclination of the mailpieces in the stack may include segmenting the profile image of the stack taken by the camera 9 into a plurality of small images or "thumbnails", and processing each thumbnail, in which processing an angle of inclination of a mailpiece is determined and that angle is compared with thresholds so as to identify whether said mailpiece is tipping forwards or backwards to too great an extent or indeed is slumped.

For example, if the paddle is leaning at an angle of 10° relative to the vertical, the comparison thresholds may be about 7° and 15°.

Stack images acquired under real operating conditions have made it possible to compile an image base of several tens of thousands of examples of scenes. A learning algorithm has been used to bring the number of examples to about one hundred significant configurations for which appropriate control of the paddle and of the floor has been determined to correct a critical position of the stack, these configurations being referred to as "scenarios".

Therefore, on the basis of the results of processing of the small images, the unit 10 is suitable for identifying various abnormal situations for the mailpieces in the stack (e.g. inclination or curvature) and of applying various corresponding scenarios.

These scenarios may also react to the dimensions, stiffness, thickness, and weight of the mailpieces 3 if such physical magnitudes are available in the unstacker.

In particular, in this example, the camera forms a digital image over the entire height occupied by the mailpieces of the stack as seen in profile, including the bottoms and the tops of the mailpieces in the stack over a certain length of the magazine starting from the unstacker head. For example, the camera is positioned 410 millimeters (mm) away from the stack to be observed with a field of vision having a width of 405 mm by a height of 210 mm so as to render in the images the edges of the mailpieces of the stack in their entirety.

A first scenario, shown in FIG. 2, concerns the stack tipping when some or all of the stack of mailpieces are leaning backwards.

In this configuration, in response to this scenario, the monitoring and control unit 10 controls the paddle 6 to cause it to move forwards, namely towards the unstacker.

The effect of the paddle 6 moving forwards causes the mailpieces 3 to be straightened up via their tops so that they are placed in the unstacking position.

Figure 3:
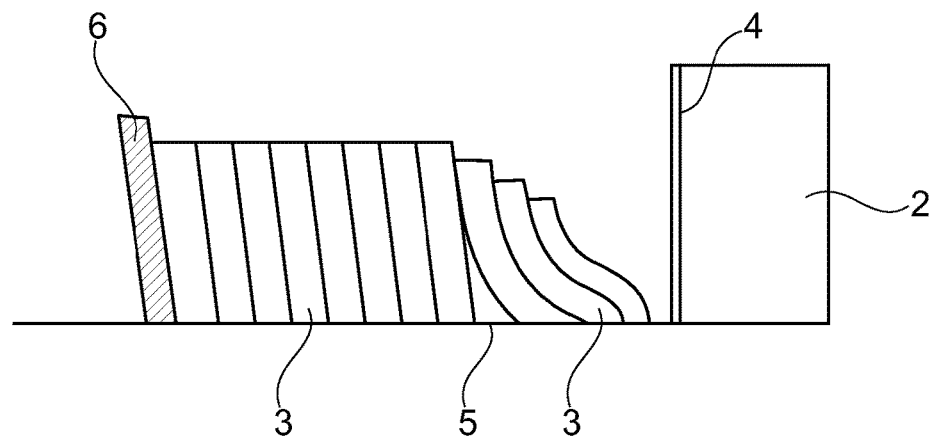
FIG. 3 is a diagrammatic view in profile of the unstacker device in a second mailpiece-tipping scenario of the invention.

The second scenario shown in FIG. 3 shows that some of the stack of mailpieces have slumped or slipped down.

For example, slumping may be caused by the floor that carries the mailpieces 3 failing to move forwards towards the unstacker head 2.

This can happen with mailpieces 3 that are floppy and that collapse at the unstacker head 2, thereby preventing unstacking from taking place.

In this configuration, the monitoring and control unit 10 causes the conveyor 5 and the paddle 6 to move forwards, before the slumping reaches a critical, jamming point.

Figure 4:
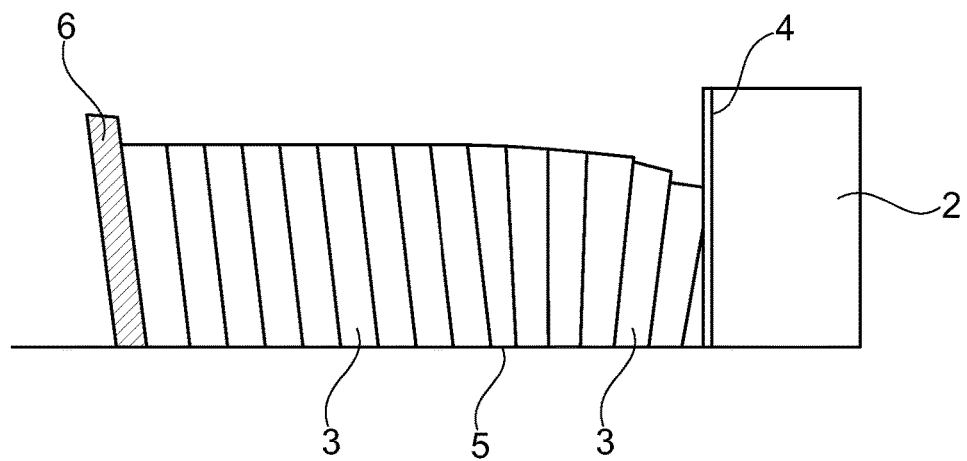
FIG. 4 is a diagrammatic view in profile of the unstacker device in a third mailpiece-tipping scenario of the invention.

The third scenario shown in FIG. 4 concerns the stack tipping forwards. In this configuration, as soon as the stack of mailpieces 3 becomes more vertical than the paddle 6, the monitoring and control unit 10 causes the paddle 6 to move backwards and/or causes the conveyor 5 to move forwards towards the head of the unstacker.

In addition, in certain types of scenario, it is also possible to move the conveyor 5 backwards on its own, to move both the conveyor 5 and the paddle 6 backwards, or indeed to move the paddle 6 forwards at the same time as moving the conveyor 5 backwards so as to take advantage of a synergistic effect of the two movements in opposite directions and so as to put the stack of mailpieces back into a satisfactory position for unstacking.

Without restricting the scope of the invention, the unstacker device 1 may have a channel-section setback or "drop" (not shown in the drawings) between the conveyor 5 and the stationary plate 4.

Naturally, the unit 10 may be arranged to manage scenarios other than those indicated above.

The invention claimed is:

1. An unstacker device comprising:
    a feed magazine suitable for storing mailpieces in a stack and on edge, the mailpieces bearing laterally against a jogging edge that extends on one side of the magazine;
    an unstacker head suitable for unstacking the mailpieces one-by-one from the front of the stack in the magazine;
    the magazine having a floor on which the mailpieces stand on edge and a retaining paddle that retains the back of the stack, the floor and the paddle being designed to move the stack towards the unstacker head under the action of a monitoring and control unit as the mailpieces are being unstacked from the front of the stack;
    a vision system suitable for detecting tipping of the stack forwards or backwards, and, for responding to such detection by causing the floor and the paddle to move in such a manner as to straighten up the stack in the magazine so as to place the mailpiece at the head of the stack in a satisfactory position of angular inclination so that it can be unstacked by the unstacker head;
    wherein the vision system is a camera disposed on the side of the magazine that is opposite from the side on which the jogging edge is situated in order to form digital images over the entire height of the mailpieces of the stack of mailpieces as seen in profile, the profile comprising a foot and a top of the mailpieces over a certain length of the magazine from the unstacker head;
    wherein the monitoring and control unit is arranged to evaluate a certain inclination of the mailpieces in the stack on the basis of the profile images of the stack and to apply from the evaluation at least one scenario to cause the floor and/or the paddle selectively or simultaneously to move forwards or backwards relative to the unstacker head so as to straighten up the stack in the magazine.

2. An unstacker device according to claim 1, wherein the paddle has a certain angular inclination, and in that the monitoring and control unit causes the floor and the paddle to move so as to place the mailpiece at the head of the stack in a position of angular inclination that is substantially identical to the position of angular inclination of the paddle.

3. An unstacker device according to claim 1, wherein the floor is provided with a setback or "drop" just before the unstacker head.

4. An unstacker device according to claim 1, wherein the monitoring and control unit is suitable for applying appropriate control to the paddle and to the floor so as to correct a critical position of the stack that corresponds to a significant configuration from scene images acquired under real operating conditions with a learning algorithm.

\* \* \* \* \*